(12) United States Patent
Iwano et al.

(10) Patent No.: US 11,685,089 B2
(45) Date of Patent: Jun. 27, 2023

(54) MANUFACTURING METHOD OF LIQUID EJECTION HEAD

(71) Applicant: CANON KABUSHIKI KAISHA, Tokyo (JP)

(72) Inventors: Takuya Iwano, Tokyo (JP); Yukuo Yamaguchi, Tokyo (JP); Toshiaki Hirosawa, Kanagawa (JP); Hiromasa Amma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 248 days.

(21) Appl. No.: 17/106,752

(22) Filed: Nov. 30, 2020

(65) Prior Publication Data

US 2021/0170647 A1    Jun. 10, 2021

(30) Foreign Application Priority Data

Dec. 4, 2019   (JP) .................................. 2019-219561

(51) Int. Cl.
*B29C 45/14*   (2006.01)
*B41J 2/14*    (2006.01)
*B29L 31/00*   (2006.01)

(52) U.S. Cl.
CPC .......... *B29C 45/14467* (2013.01); *B41J 2/14* (2013.01); *B29K 2905/00* (2013.01); *B29L 2031/767* (2013.01)

(58) Field of Classification Search
CPC ................... B29C 45/14467; B41J 2/14; B41J 2002/14467; B41J 2/1637
See application file for complete search history.

(56) References Cited

U.S. PATENT DOCUMENTS

| | | | |
|---|---|---|---|
| 10,363,692 B2 | 7/2019 | Oikawa et al. | |
| 10,434,694 B2 | 10/2019 | Iijima et al. | |
| 10,513,069 B2 | 12/2019 | Oikawa et al. | |
| 10,525,711 B2 | 1/2020 | Amma et al. | |
| 2016/0346968 A1* | 12/2016 | Kimura | B41J 2/1752 |
| 2017/0368728 A1 | 12/2017 | Oikawa et al. | |
| 2018/0141339 A1* | 5/2018 | Iwano | B41J 2/1637 |
| 2018/0141341 A1* | 5/2018 | Amma | B41J 2/1637 |

FOREIGN PATENT DOCUMENTS

JP    2018-083349 A    5/2018

* cited by examiner

*Primary Examiner* — Robert B Davis

(74) *Attorney, Agent, or Firm* — Venable LLP

(57) ABSTRACT

A manufacturing method of a liquid ejection head including manufacturing a flow path constituting member for supplying a liquid to an ejection module, the manufacturing a flow path constituting member including using a metal mold which is constituted of a fixed mold and a movable mold, the manufacturing a flow path constituting member including: a first step of molding a first member, a second member, and a third member independently at locations different from each other in the metal mold, the first member, the second member, and the third member constituting the flow path constituting member; a second step of joining the first member and the second member in a specific manner; and a third step of joining the second member and the third member in a specific manner.

19 Claims, 12 Drawing Sheets

FIG. 8A
FIG. 8B
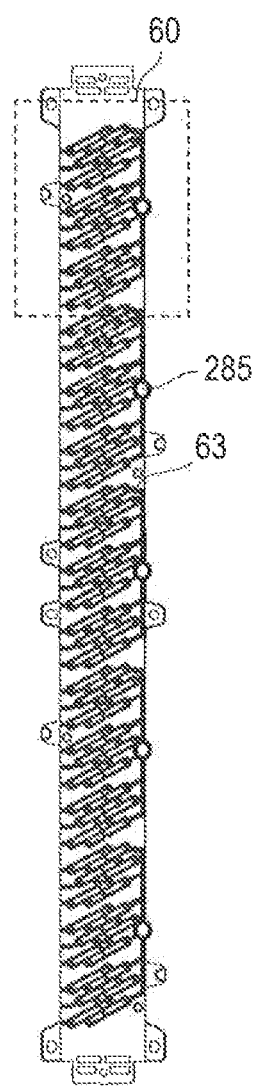
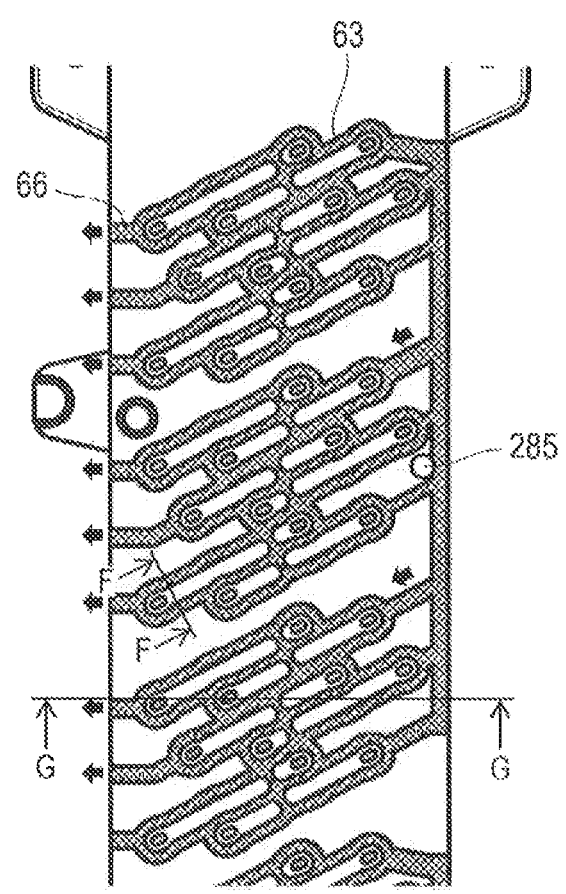

MANUFACTURING METHOD OF LIQUID EJECTION HEAD

BACKGROUND OF THE INVENTION

Field of the Invention

The present disclosure relates to a manufacturing method of a liquid ejection head.

Description of the Related Art

As a liquid ejection head that ejects liquid such as ink from an ejection port and records an image on a recording medium, there is a liquid ejection head of a page wide type that has length corresponding to the width of the recording medium and performs a recording operation on the conveyed recording medium in a state in which the liquid ejection head is fixed to an apparatus main body. The liquid ejection head of the page wide type can simultaneously record many images compared with a liquid ejection head of a serial type that performs a recording operation while moving in the width direction of a recording medium. Therefore, the liquid ejection head of the page wide type is often adopted in a liquid ejection apparatus for which high-speed recording is requested.

Japanese Patent Application Laid-Open No. 2018-083349 describes a method of manufacturing a flow path constituting member for supplying liquid to a plurality of ejection modules among members constituting a liquid ejection head of a page wide type. In this method, first, three members constituting a flow path constituting member are independently molded at different locations in a metal mold by injection molding of resin (primary molding). After mold opening, the metal mold is slid to perform alignment of the three members, a mold is clamped again to bring the three members into contact with one another, and melted resin is injected into a contacting portion of three members to join the three members (secondary molding). By adopting such a method, it is possible to highly accurately manufacture a flow path constituting member having a complicated hollow structure such as a liquid flow path on the inside.

SUMMARY OF THE INVENTION

In the manufacturing method explained above, since the flow path constituting member is a long member corresponding to the width of the recording medium, the number of joining portions during the secondary molding necessarily increases. In order to cope with this problem, it is necessary to increase the number of gates set in the metal mold. However, this leads to an increase in the size of the metal mold, leading to an increase in a molded article. On the other hand, in order to avoid such an increase in the size, it is conceivable to form, in the metal mold, an introduction path (a runner) for guiding resin ejected from the gate to the joining portion. However, the metal mold is complicated by setting the runner. Moreover, in particular, in the case of a long flow path constituting member, a filling property of the resin into the joining portion is deteriorated and a filling failure (shortage) is likely to occur.

Therefore, an object of the present disclosure is to provide a manufacturing method of a liquid ejection head that can manufacture a flow path constituting member, which is a resin molded article, with high reliability without causing an increase in the size and complication of a metal mold.

In order to achieve the object described above, a manufacturing method of a liquid ejection head of the present disclosure includes manufacturing a flow path constituting member for supplying a liquid to a plurality of an ejection module, the manufacturing a flow path constituting member including using a metal mold which is constituted of a fixed mold and a movable mold, and the ejection module being configured to eject the liquid, the manufacturing a flow path constituting member including: a first step of molding a first member, a second member, and a third member independently at locations different from each other in the metal mold by clamping the metal mold and injecting a resin to an inside of the metal mold, the first member, the second member, and the third member constituting the flow path constituting member; a second step of joining the first member and the second member by injecting a first sealing resin to a contacting portion, the contacting portion is formed by contacting the first member and the second member each other by clamping the metal mold after opening the metal mold and sliding the movable mold to a position at which the first member retained at the movable mold and the second member retained at the fixed mold are opposite to each other; and a third step of joining the second member and the third member by injecting a second sealing resin to a contacting portion, the contacting portion is formed by contacting the second member and the third member each other by clamping the metal mold after opening the metal mold and sliding the movable mold to a position at which the second member retained at the movable mold and the third member retained at the fixed mold are opposite to each other.

Further features of the present invention will become apparent from the following description of exemplary embodiments with reference to the attached drawings.

BRIEF DESCRIPTION OF THE DRAWINGS

FIGS. 8A and 8B are plan views for explaining a secondary molding step according to the embodiment.

DESCRIPTION OF THE EMBODIMENTS

An embodiment of the present disclosure is explained below with reference to the drawings. However, the embodiment explained below does not limit the scope of the present disclosure.

Figure 1A:
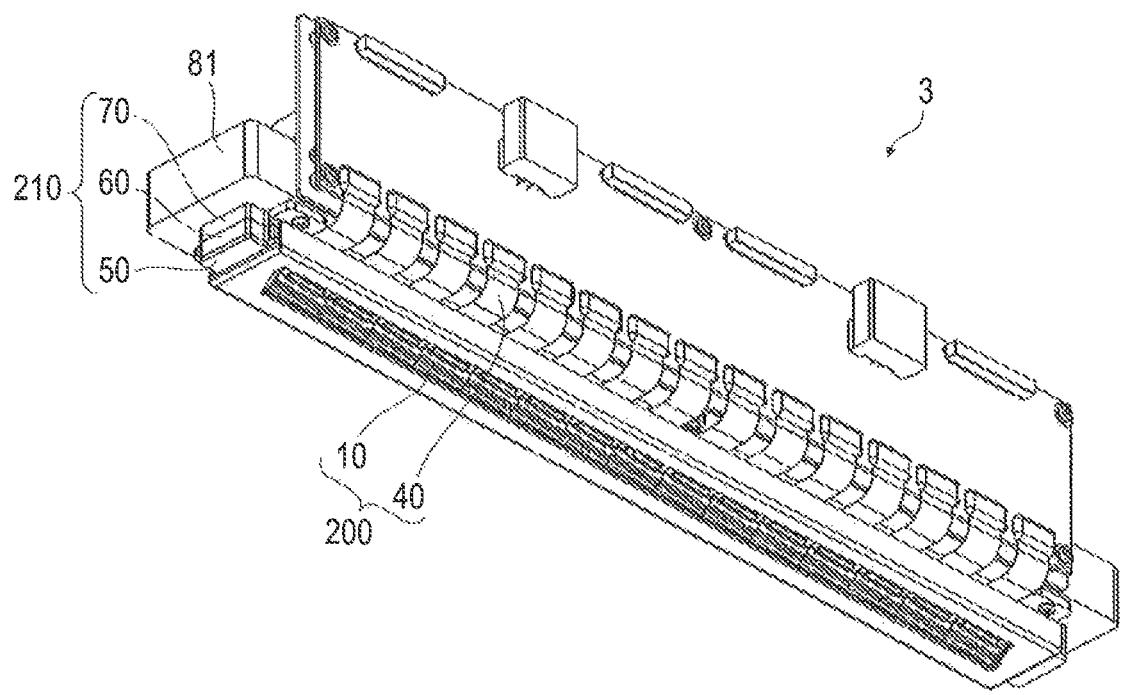
FIGS. 1A and 1B are perspective views of a liquid ejection head according to an embodiment.
Figure 1B:
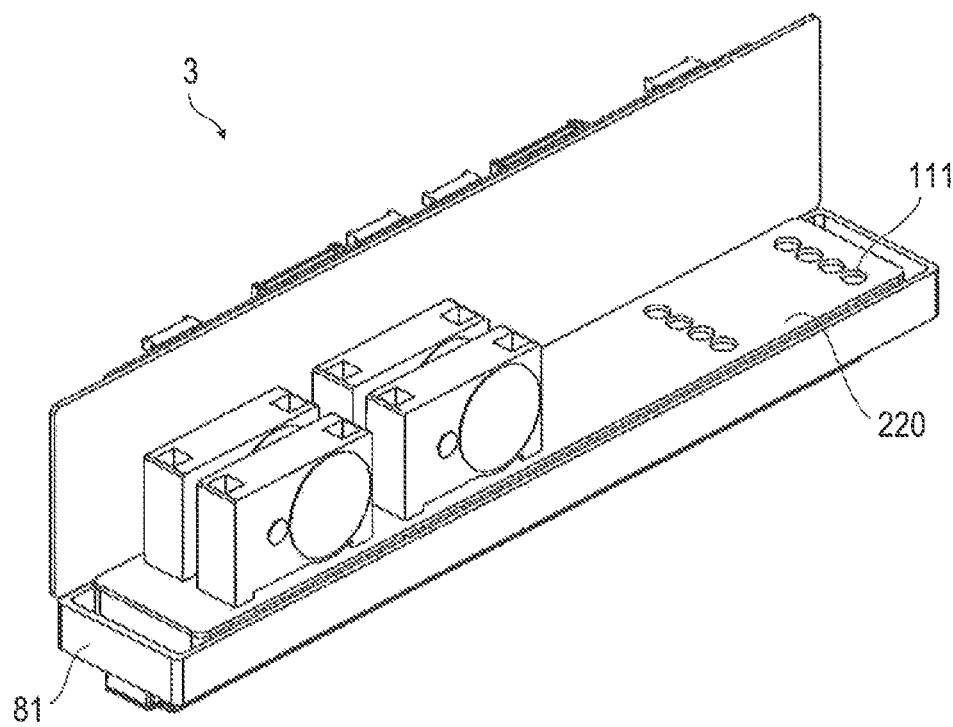

FIGS. 1A and 1B are perspective views of a liquid ejection head according to an embodiment of the present disclosure.

A liquid ejection head 3 is a liquid ejection head of a line type (a page wide type) having length corresponding to the width of a recording medium and includes fifteen recording element substrates 10 arrayed linearly (inline) in the longitudinal direction of the liquid ejection head. The recording element substrates 10 constitute an ejection module 200 in conjunction with a flexible wiring board 40 and are capable of ejecting inks of four colors of cyan (C)/magenta (M)/yellow (Y)/black (K). The liquid ejection head 3 is connected to a liquid supply system of a liquid ejection apparatus (not illustrated) via a liquid connection section 111 of a liquid supply unit 220. Consequently, the inks of four colors of CMYK are supplied from the liquid supply system of the liquid ejection apparatus to the liquid ejection head 3 and collected in the liquid supply system of the liquid ejection apparatus through the liquid ejection head 3. In this way, the inks of the colors are capable of circulating between the liquid ejection apparatus and the liquid ejection head 3.

The liquid ejection head 3 includes a flow path constituting member 210 that supports a plurality of ejection modules 200. The flow path constituting member 210 is constituted from first, second, and third flow path members 50, 60, and 70, each of which is formed in an elongated rectangular plate shape. The first, second, and third flow path members are stacked one on top of another and joined. The plurality of ejection modules 200 are joined to a joining surface 53 (see FIGS. 2A to 2F) of the first flow path member 50 by an adhesive. The flow path constituting member 210 is a member for supplying liquid to the plurality of ejection modules 200 that eject the liquid. That is, the flow path constituting member 210 includes, on the inside, a flow path for distributing ink supplied from the liquid supply unit 220 to the ejection modules 200 and returning the ink, which recirculates from the ejection modules 200, to the liquid supply unit 220. The flow path constituting member 210 is fixed to a liquid-ejection-unit supporting section 81 by screwing.

It is preferable that the first, second, and third flow path members 50, 60, and 70 have sufficient corrosion resistance against liquid (ink) and are made of a material having a low coefficient of linear expansion. As such a material, a composite material including a resin material as a base material and added with an inorganic filler such as silica particulates or fiber. Examples of the resin material used as the base material include LCP (liquid crystal polymer), PPS (polyphenyl sulfide), PSF (polysulfone), and modified PPE (polyphenylene ether). As dimensions of the first, second, and third flow path members 50, 60, and 70, as an example, length in the latitudinal direction is approximately 30 mm, length in the longitudinal direction is approximately 260 mm (A4 width) to approximately 350 mm (A3 width) corresponding to a paper width of the liquid ejection head of the page wide type.

Figure 2A:
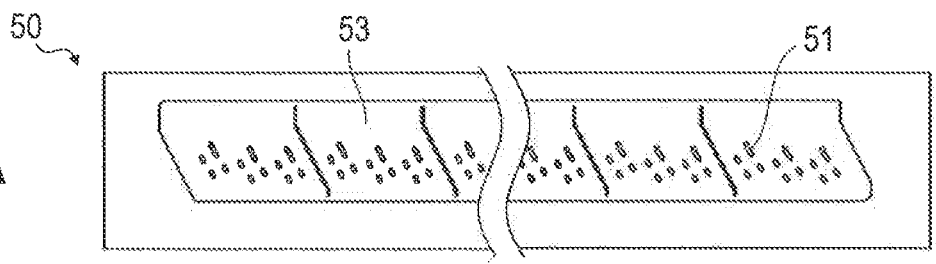
FIGS. 2A, 2B, 2C, 2D, 2E, and 2F are plan views illustrating front surfaces and rear surfaces of flow path members according to the embodiment.
Figure 2B:
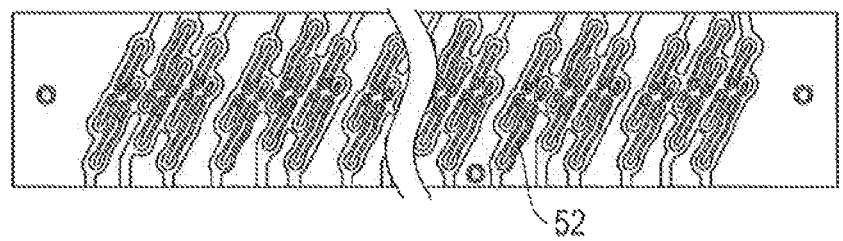
Figure 2C:
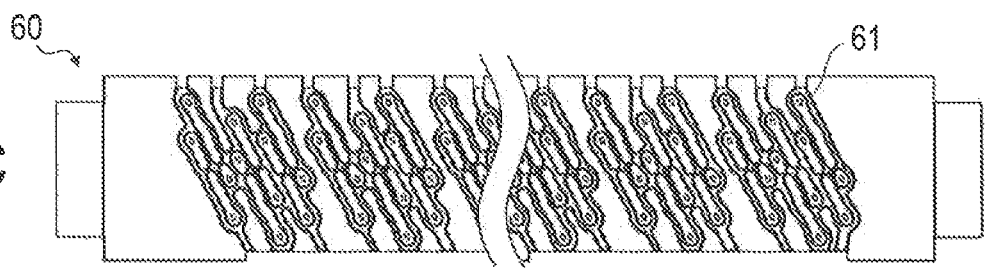
Figure 2D:
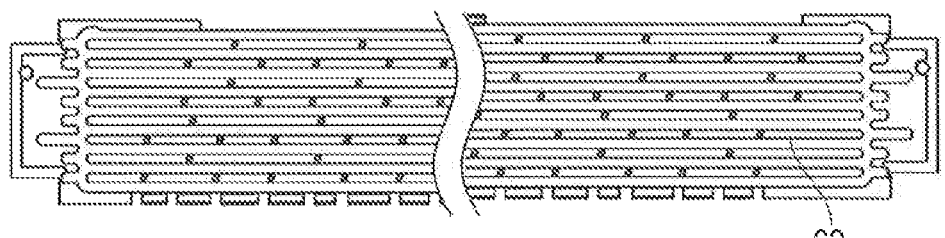
Figure 2E:
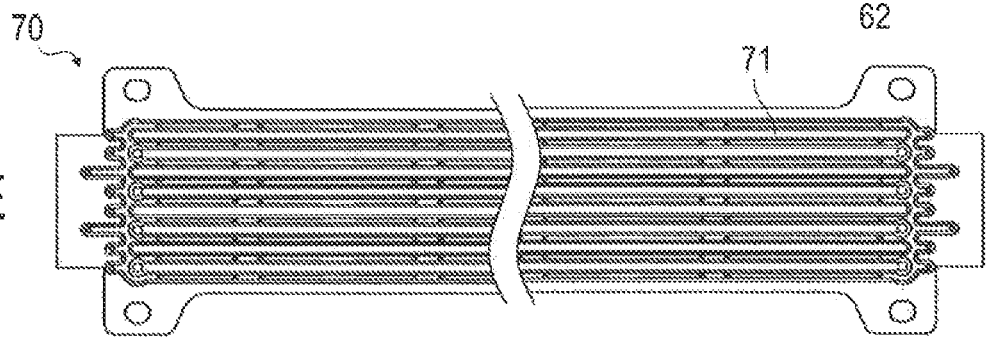
Figure 2F:
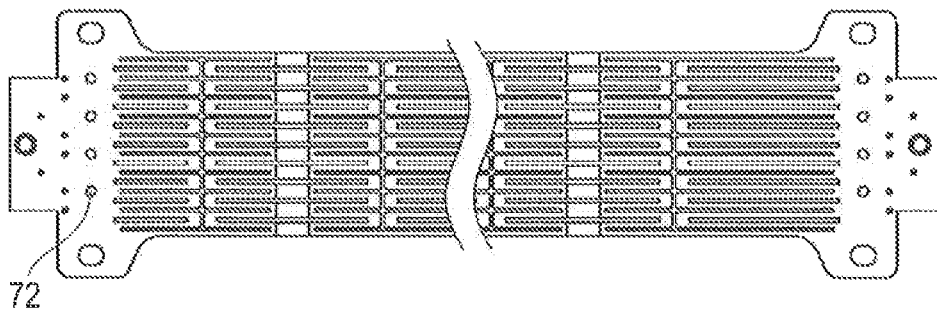

FIGS. 2A and 2B are plan views illustrating a front surface and a rear surface of a first flow path member. FIGS. 2C and 2D are plan views illustrating a front surface and a rear surface of a second flow path member. FIGS. 2E and 2F are plan view illustrating a front surface and a rear surface of a third flow path member. In FIG. 2A, a joining surface 53, to which the ejection module 200 is joined, of a first flow path member 50 is illustrated. In FIG. 2F, a surface, with which the liquid-ejection-unit supporting section 81 is brought into contact, of a third flow path member 70 is illustrated.

The first flow path member 50 and a second flow path member 60 are joined such that a surface illustrated in FIG. 2B and a surface illustrated in FIG. 2C are opposed. When the first and second flow path members 50 and 60 are joined, a plurality of individual flow paths 213 and 214 (see FIGS. 3A and 3B) are formed by individual flow path grooves 52 formed in the first flow path member 50 and the second flow path member 60. The second flow path member 60 and the third flow path member 70 are joined such that a surface illustrated in FIG. 2D and a surface illustrated in FIG. 2E are opposed. When the second and third flow path members 60 and 70 are joined, eight common flow paths 211 and 212 (see FIGS. 3A and 3B) extending in the longitudinal direction of the flow path constituting member 210 are formed by common flow path grooves 62 formed in the second flow path member 60 and common flow path grooves 71 formed in the third flow path member 70. Specifically, a pair of the common supply flow path 211 and the common collection flow path 212 are formed in the flow path constituting member 210 for each of the colors of the inks.

In the third flow path member 70, a communication port 72 fluidly communicating with the liquid supply unit 220 is formed. A plurality of communication ports 61 are formed in the bottom surfaces of the common flow path grooves 62 of the second flow path member 60. The communication ports 61 communicate with one end portions of the individual flow path grooves 52 of the first flow path member 50. Communication ports 51 are formed at the other end portions of the individual flow path grooves 52 of the first flow path member 50. The communication ports 51 fluidly communicate with the ejection module 200. Flow paths can be integrated near the center in the latitudinal direction of the flow path constituting member 210 by the individual flow path grooves 52.

Figure 3A:
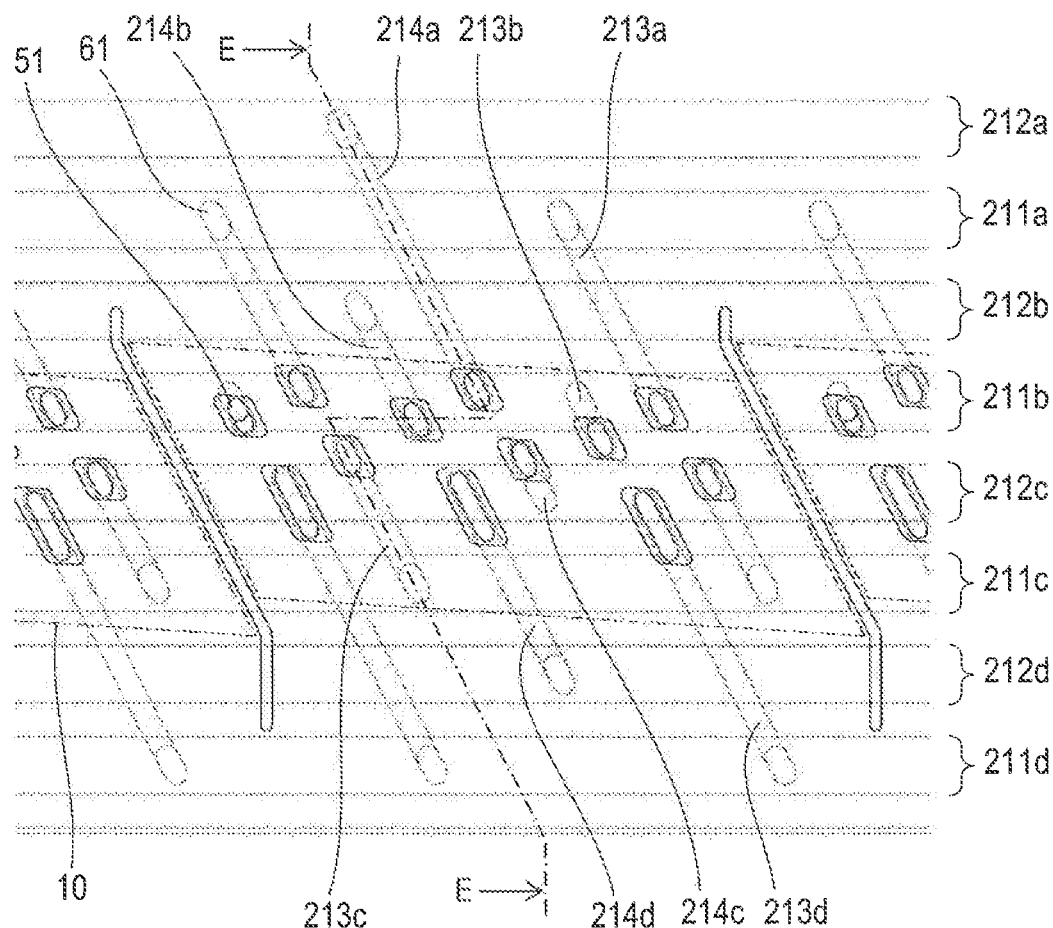
FIG. 3A is a perspective plan view of a flow path constituting member according to the embodiment.
Figure 3B:
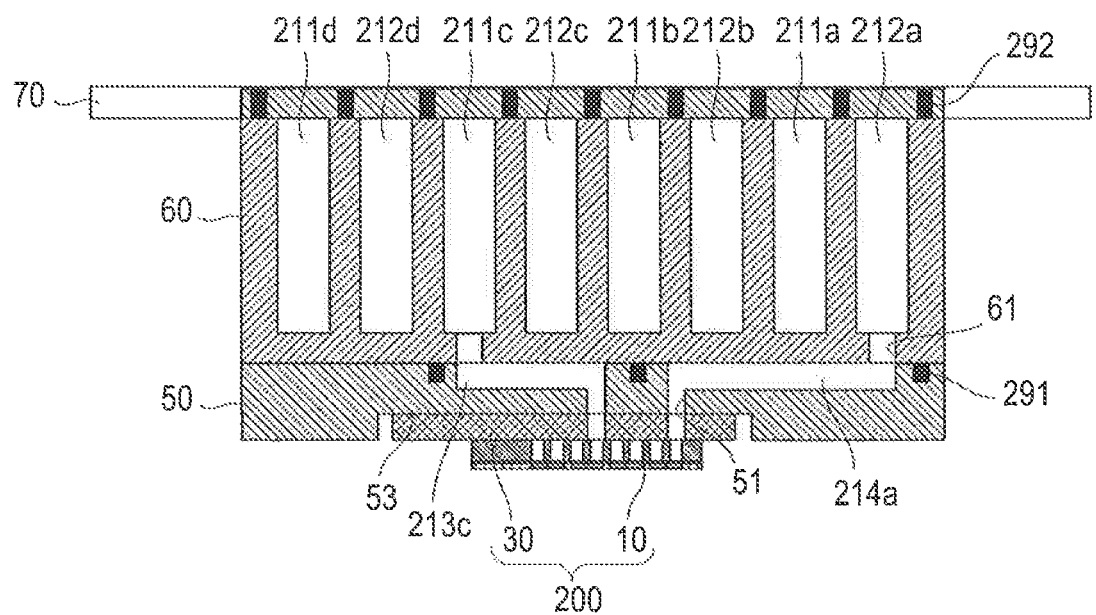
FIG. 3B is a sectional view of the flow path constituting member according to the embodiment.

FIG. 3A is a perspective plan view enlarging and illustrating a part of the flow path constituting member and is a view from a side of a joining surface of the first flow path member. FIG. 3B is a sectional view taken along an E-E line of FIG. 3A.

In the flow path constituting member 210, as explained above, the common supply flow paths 211 (211a, 211b, 211c, and 211d) and the common collection flow paths 212 (212a, 212b, 212c, and 212d) extending in the longitudinal direction of the liquid ejection head 3 are provided for each of the colors of the inks. The common supply flow paths 211 of the colors are connected to, via the communication ports 61, a plurality of individual supply flow paths 213 (213a, 213b, 213c, and 213d) extending in a direction crossing the common supply flow paths 211. The common collection flow paths 212 of the colors are connected to, via the communication ports 61, a plurality of individual collection flow paths 214 (214a, 214b, 214c, and 214d) extending in a direction crossing the common collection flow paths 212. Further, the individual supply flow paths 213 and the individual collection flow paths 214 respectively fluidly communicate with the ejection modules 200 via the communication ports 51. With such a flow path configuration, it is possible to intensively supply the inks from the common supply flow paths 211 to the recording element substrates 10 located near the center of the flow path constituting member 210 via the individual supply flow paths 213. It is possible to collect the inks from the recording element substrates 10 to the common collection flow paths 212 via the individual collection flow paths 214.

On a supporting member 30 and the recording element substrate 10 included in the ejection module 200, flow paths for supplying the inks from the first flow path member 50 to recording elements (not illustrated) provided in the recording element substrate 10 are formed. Further, on the supporting member 30 and the recording element substrate 10, flow paths for collecting (recirculating) a part or all of the inks supplied to the recording elements to the first flow path member 50 are also formed. In this way, in the liquid ejection head 3 in this embodiment, for each of the colors of the inks, a flow of the ink flowing to the common supply flow paths 211, the individual supply flow paths 213, the recording element substrate 10, the individual collection flow paths 214, and the common collection flow paths 212 in order is generated.

Figure 4A:
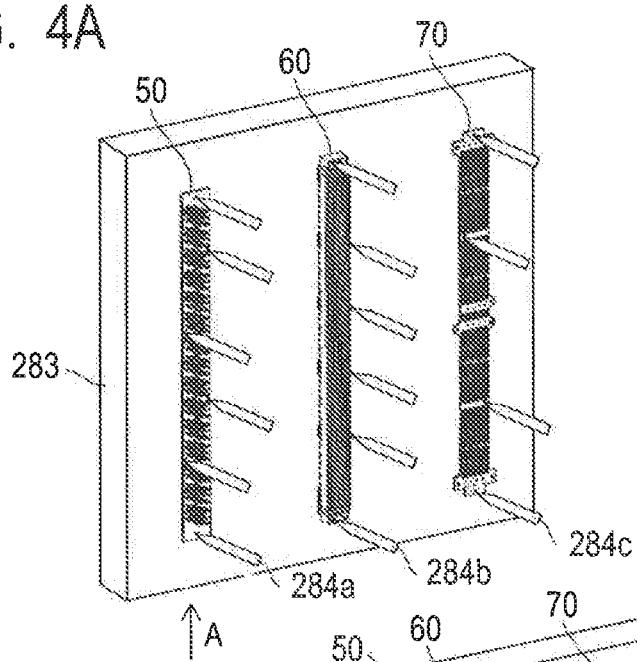
FIGS. 4A, 4B, and 4C are perspective views illustrating steps of a manufacturing method of a flow path constituting member according to the embodiment.
Figure 4B:
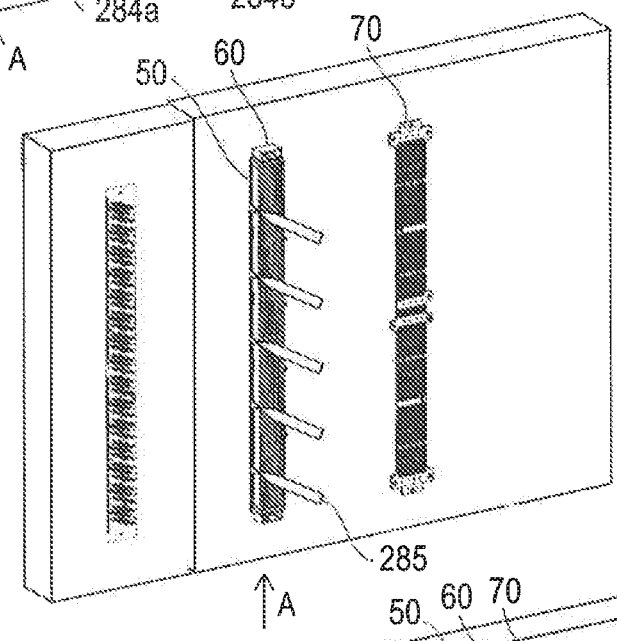
Figure 4C:
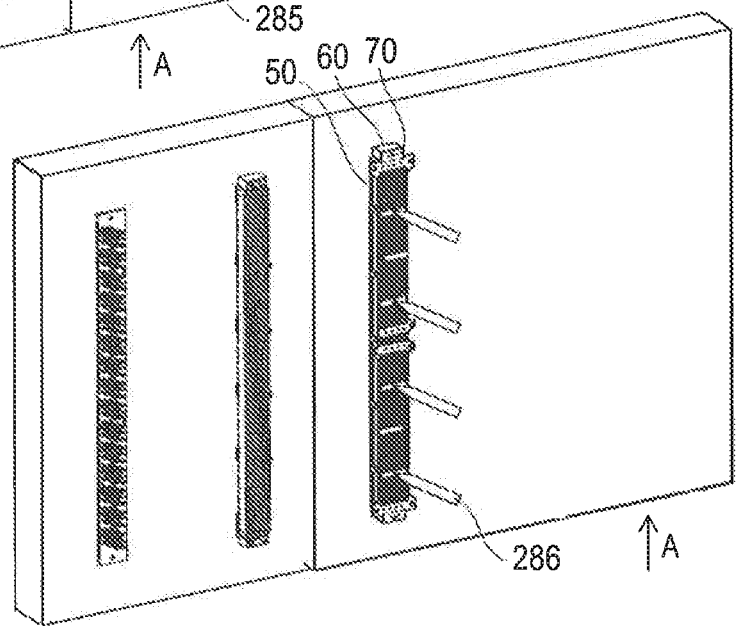

Subsequently, in particular, a manufacturing method of a flow path constituting member, which is a resin molded article, in the manufacturing method of the liquid ejection head in this embodiment is explained with reference to FIGS. 4A to 7B. First, an overview of the manufacturing method of the flow path constituting member in this embodiment is explained with reference to FIGS. 4A to 4C. FIGS. 4A to 4C are respectively perspective view illustrating steps of the manufacturing method of the flow path constituting member in this embodiment.

The flow path constituting member 210 in this embodiment is schematically manufactured by three steps using a metal mold formed from the fixed mold 282 (see FIGS. 5A to 7B) and the movable mold 283. In a primary molding step (a first step), as illustrated in FIG. 4A, melted resin is ejected into the inside of the metal mold from valve gates 284a to 284c to independently mold the first, second, and the third flow path members 50, 60, and 70. In a secondary molding step (a second step), as illustrated in FIG. 4B, the first flow path member 50 and the second flow path member 60 are brought into contact with each other. Sealing resin (first sealing resin) for secondary molding is injected into a contacting portion of the first flow path member 50 and the second flow path member 60 from a valve gate 285 to join both the members 50 and 60. In a tertiary molding step (a third step), as illustrated in FIG. 4C, the second flow path member 60 and the third flow path member 70 are brought into contact with each other. Sealing resin (second sealing resin) for tertiary molding is injected into a contacting portion of the second flow path member 60 and the third flow path member 70 from a valve gate 286 to join both the members 60 and 70.

Subsequently, details of the manufacturing method of the flow path constituting member in this embodiment are explained with reference to FIGS. 5A to 7B. FIGS. 5A to 7B are sectional views illustrating the steps of the manufacturing method of the flow path constituting member in this embodiment and are respectively views from an A direction in FIGS. 4A to 4C. Note that FIG. 5A corresponds to the primary molding step illustrated in FIG. 4A, FIG. 6A corresponds to the secondary molding step illustrated in FIG. 4B, and FIG. 7A corresponds to the tertiary molding step illustrated in FIG. 4C.

Figure 5A:
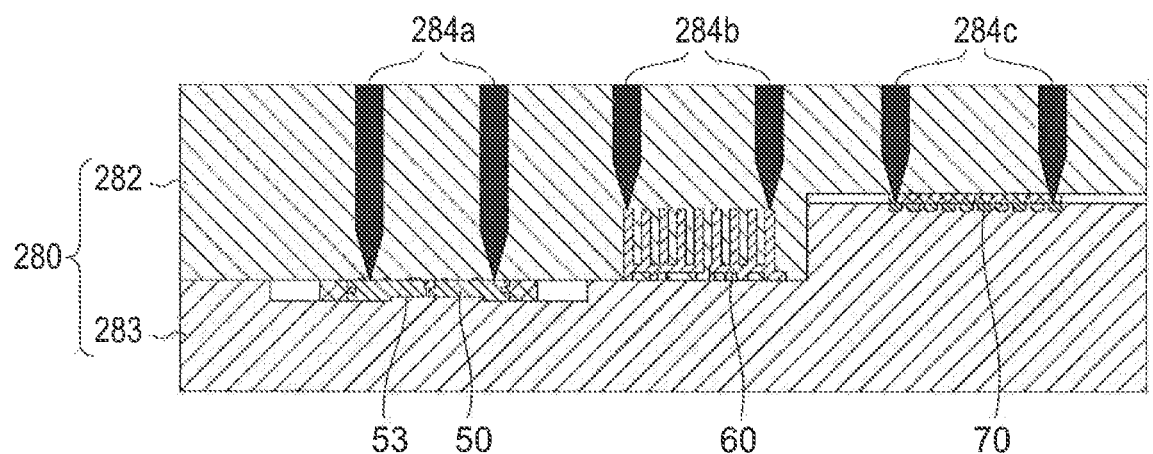
FIGS. 5A, 5B, and 5C are sectional views illustrating the steps of the manufacturing method of the flow path constituting member according to the embodiment.

First, as illustrated in FIG. 5A, a metal mold 280 formed by the fixed mold 282 and the movable mold 283 is clamped. Melted resin is ejected into the inside of the metal mold 280 from the valve gates 284a to 284c. Consequently, the first, second, and third flow path members 50, 60, and 70 are independently formed at different locations in the metal mold 280.

Figure 5B:
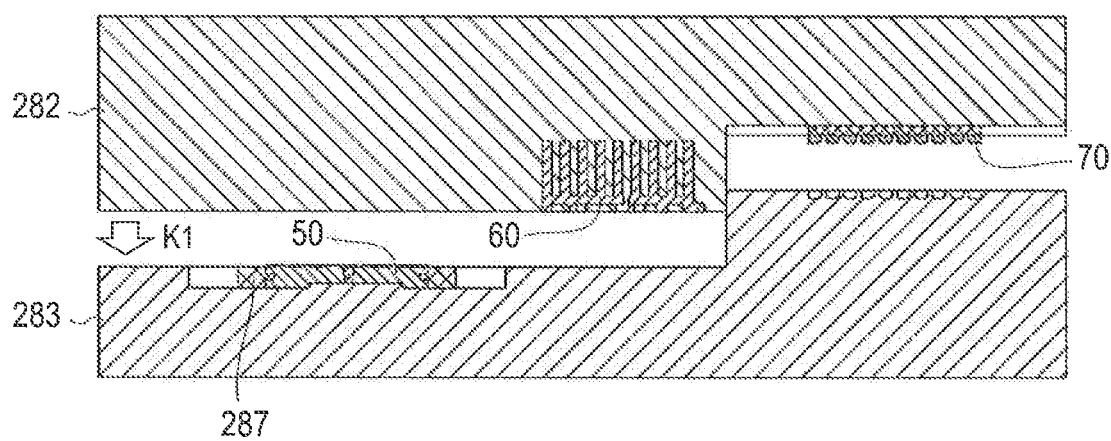
Figure 5C:
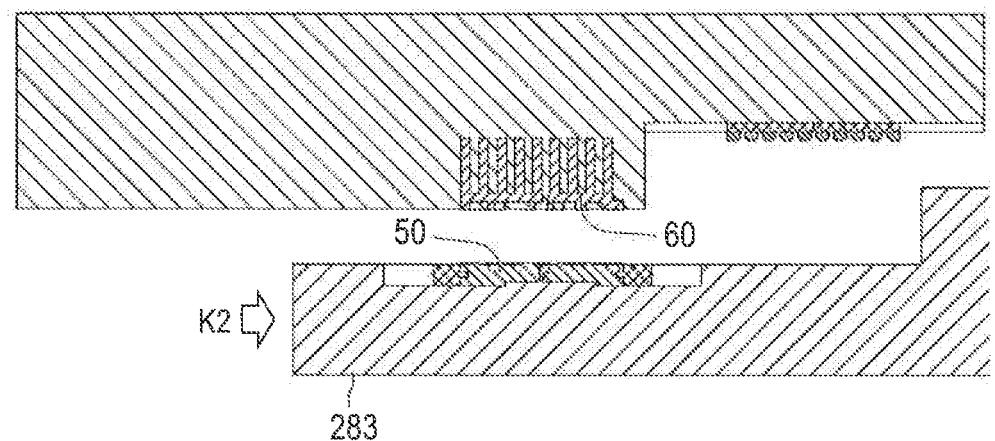

When the primary molding step is completed in this way, as illustrated in FIG. 5B, the movable mold 283 moves in a direction of an arrow K1 and the metal mold 280 is opened. At this time, the first flow path member 50 is retained by a slide die 287 provided in the movable mold 283. The second and third flow path members 60 and 70 are respectively retained by a die 288 (see FIG. 9B) and a die 289 (see FIG. 11C) provided in the fixed mold 282. As illustrated in FIG. 5C, in a state in which the movable mold 283 retains the first flow path member 50, the movable mold 283 slides in a direction of an arrow K2 to a position where the first flow path member 50 is opposed to the second flow path member 60.

Figure 6A:
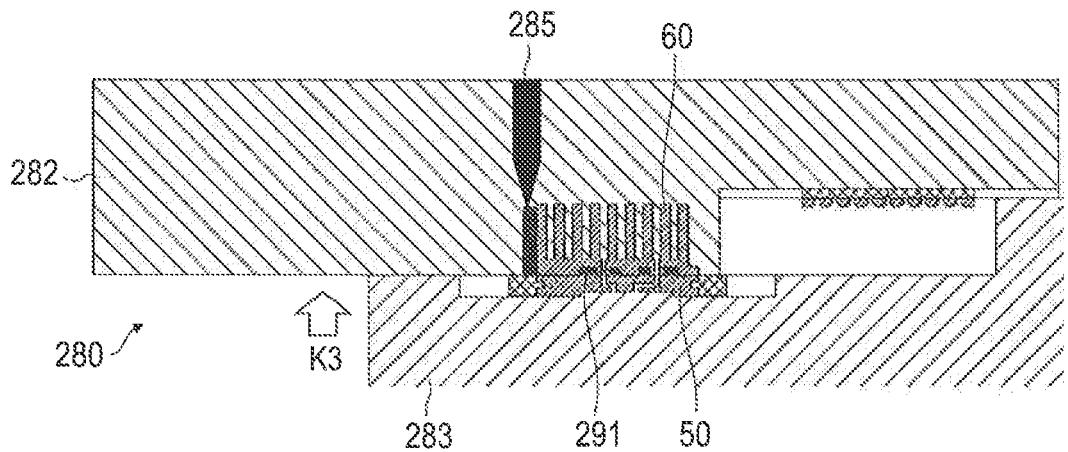
FIGS. 6A, 6B, and 6C are sectional views illustrating the steps of the manufacturing method of the flow path constituting member according to the embodiment.

Subsequently, as illustrated in FIG. 6A, the movable mold 283 moves in a direction of an arrow K3 toward the fixed mold 282 and the metal mold 280 is clamped. At this time, the first flow path member 50 and the second flow path member 60 come into contact with each other. The individual flow paths 213 and 214 are formed in a contacting portion of the first flow path member 50 and the second flow path member 60. Sealing passages in which the sealing resin (the secondary molding resin) for the secondary molding is filled are formed around the contacting portion. Secondary molding resin 291 is injected into the sealing passages from the valve gate 285, whereby the first flow path member 50 and the second flow path member 60 are joined and integrated.

Figure 6B:
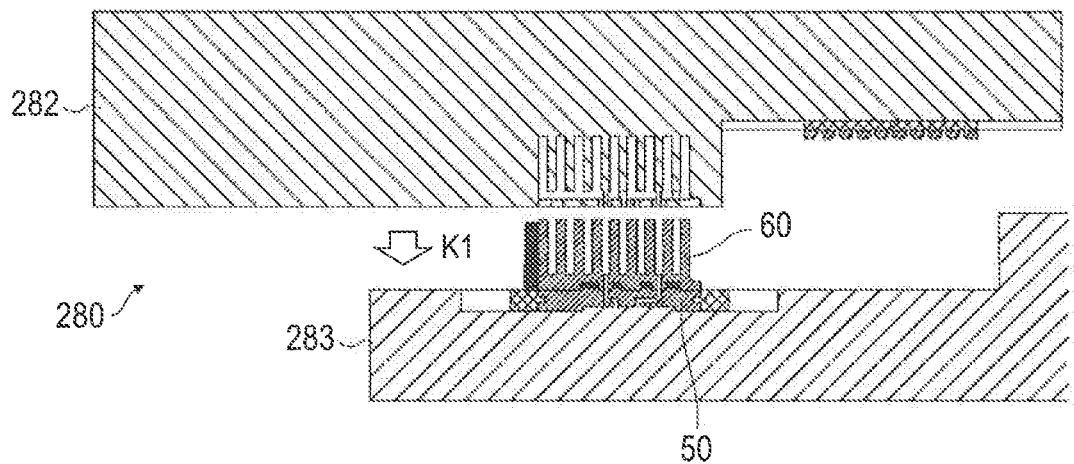
Figure 6C:
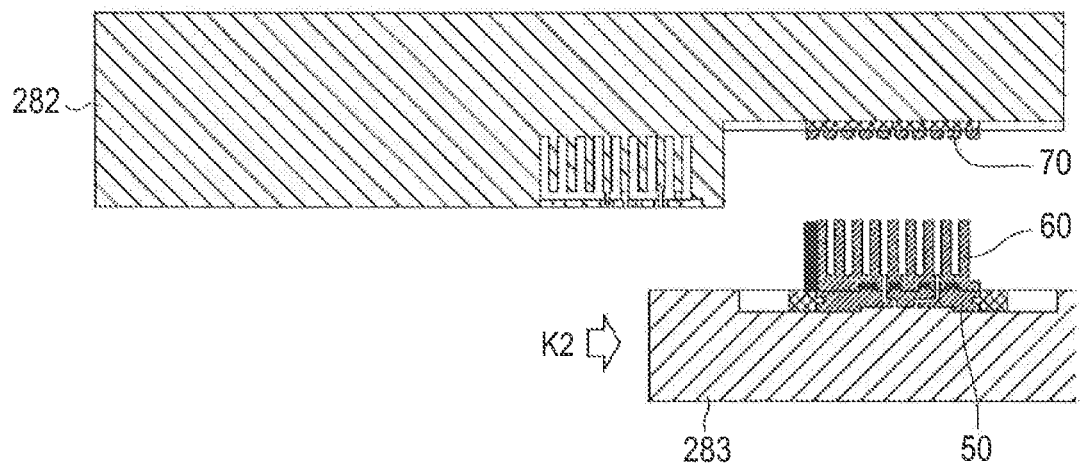

When the secondary molding step is completed in this way, as illustrated in FIG. 6B, the movable mold 283 moves in the direction of the arrow K1 again and the metal mold 280 is opened. At this time, the second flow path member 60 is retained by the movable mold 283 together with the integrated first flow path member 50. As illustrated in FIG. 6C, in a state in which the movable mold 283 retains the second flow path member 60 via the first flow path member 50, the movable mold 283 slides in the direction of the arrow K2 to a position where the second flow path member 60 is opposed to the third flow path member 70 retained by the fixed mold 282.

Figure 7A:
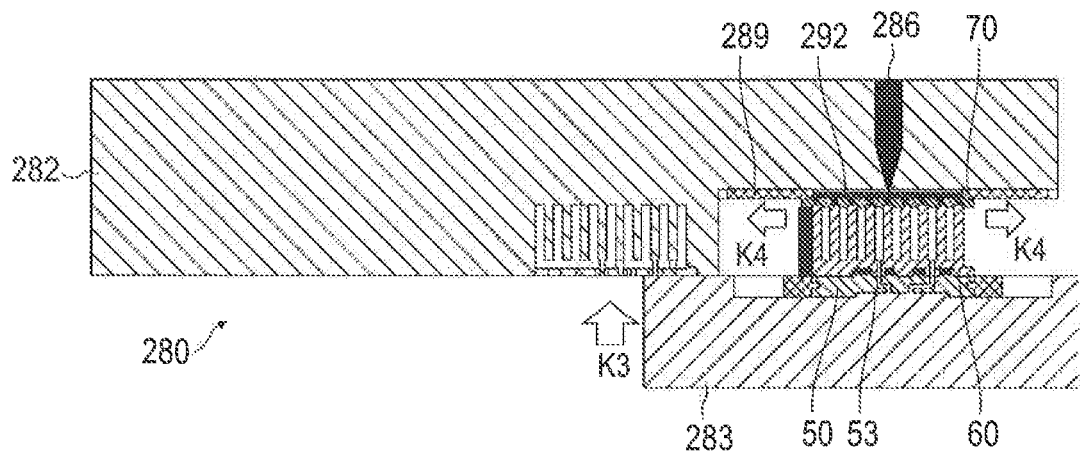
FIGS. 7A and 7B are sectional views for explaining the manufacturing method according to the embodiment.

Subsequently, as illustrated in FIG. 7A, the movable mold 283 moves in the direction of the arrow K3 toward the fixed mold 282 and the metal mold 280 is clamped. At this time, the second flow path member 60 and the third flow path member 70 come into contact with each other. The common flow paths 211 and 212 are formed in a contacting portion of the second flow path member 60 and the third flow path member 70. Sealing passages for filling sealing resin (tertiary molding resin) for tertiary molding are formed around the contacting portion. As explained in detail below, the slide die 289 provided in the fixed mold 282 slides in a direction of an arrow K4 and a space for injecting the tertiary molding resin is formed. Tertiary molding resin 292 is injected into the sealing passages from the valve gate 286 through this space, whereby the second flow path member 60 and the third flow path member 70 are joined and the integrated flow path constituting member 210 is manufactured.

Figure 7B:
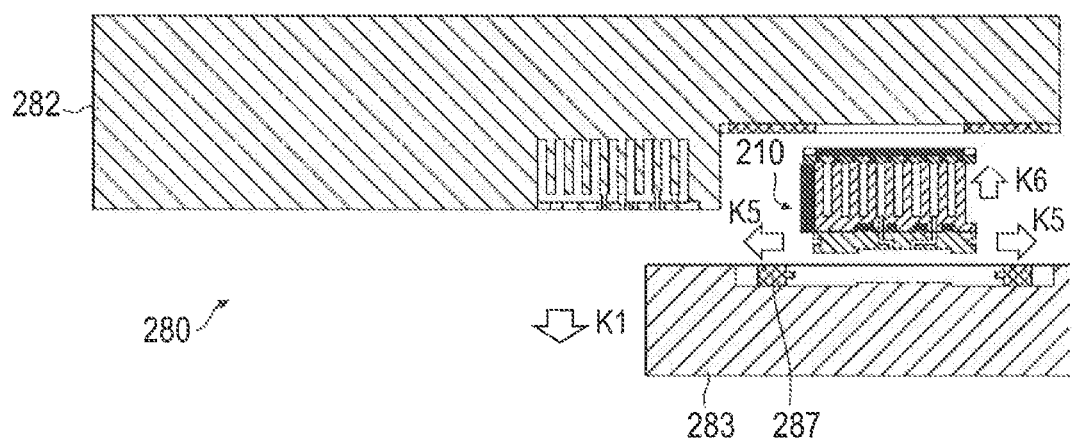

When the tertiary molding step is completed in this way, as illustrated in FIG. 7B, the movable mold 283 moves in the direction of the arrow K1 again and the metal mold 280 is opened. At this time, the integrated flow path constituting member 210 moves in the direction of the arrow K1 in a state in which the flow path constituting member 210 is retained by the movable mold 283. Thereafter, the slide die 287 of the movable mold 283 slides in a direction of an arrow K5 and the retaining of the first flow path member 50 is released. The flow path constituting member 210 is pulled out in a direction of an arrow K6 and removed from the movable mold 283.

In this way, with the manufacturing method in this embodiment, the secondary molding resin 291 and the tertiary molding resin 292 are respectively injected from different positions of the fixed mold 282. Specifically, the secondary molding resin 291 is injected from the valve gate 285, which is provided in the fixed mold 282, in a position opposed to the second flow path member 60. The tertiary molding resin 292 is injected from the valve gate 286, which is provided in the fixed mold 282, in a position opposed to the third flow path member 70. Consequently, it is unnecessary to densely dispose gates in the fixed mold of the metal mold or dispose the gates via a runner. As a result, it is possible to avoid an increase in the size and complication of the metal mold. In particular, it is also possible to improve a filling property of the tertiary molding resin.

Incidentally, in molding of thermoplastic resin, when a metal mold is removed from a molded article, the temperature of the metal mold is higher than an environment temperature around the metal mold. Thereafter, when the metal mold is left untouched, the temperature of the metal mold drops to the environment temperature. However, at this time, the molded article is not fixed to the metal mold. Cooling of the molded article advances while residual stress being released. Accordingly, deformation such as a bend or undulation tends to occur in a molded article and particularly conspicuously tends to occur in a long molded article. For example, when deformation such as a bend or undulation occurs in a flow path constituting member, it is likely that relative position accuracy of a plurality of ejection modules is deteriorated when the ejection modules are bonded along the deformation in order to secure high bonding reliability. Consequently, there is a concern about deterioration in image quality. On the other hand, in order to secure the relative position accuracy of the plurality of ejection modules, it is necessary to adjust an amount of adhesive for each of the ejection modules according to deformation of the flow path constituting member. Consequently, it is likely that high bonding reliability cannot be secured and an ink leak occurs.

In contrast, in this embodiment, as illustrated in FIGS. 5A to 7A, in the primary molding step to the tertiary molding step, the first flow path member 50 is retained in a state in which a joining surface 53, to which the ejection module 200 is joined, is in contact with the movable mold 283. Consequently, it is possible to increase a cooling time of the first flow path member 50 in the metal mold 280. It is possible to suppress deformation such as a bend or undulation to obtain the flat joining surface 53. It is also advantageous to suppress deformation of the joining surface 53 during a molding step that the first flow path member 50 is surely retained by the slide die 287 and temperature control for the movable mold 283 is easy because a heat source such as a valve gate is absent. In this way, in this embodiment, it is possible to achieve both of the high bonding reliability of the flow path constituting member 210 and the ejection module 200 and the securing of the relative position accuracy of the plurality of ejection modules 200.

Figure 9A:
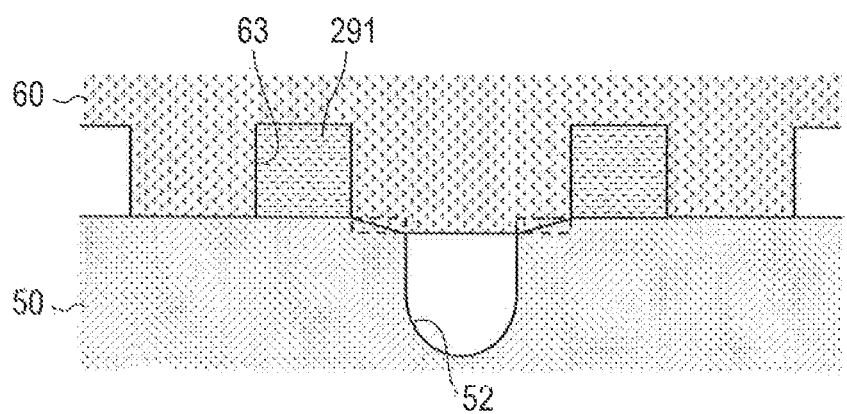
FIGS. 9A and 9B are sectional views for explaining the secondary molding step according to the embodiment.
Figure 9B:
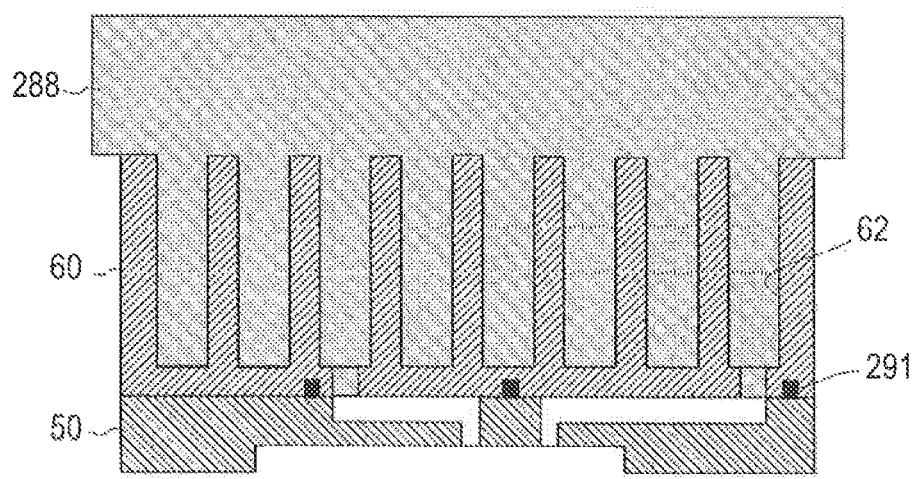

Subsequently, details of the secondary molding step in the manufacturing method of the flow path constituting member in this embodiment are explained with reference to FIGS. 8A, 8B, 9A, and 9B. FIG. 8A is a plan view of the second flow path member and is a view illustrating an inflow route of the secondary molding resin. FIG. 8B is an enlarged view of a region surrounded by a broken line in FIG. 8A. FIG. 9A is a sectional view taken along an F-F line in FIG. 8B. FIG. 9B is a sectional view taken along a G-G line in FIG. 8B. Note that, in FIGS. 9A and 9B, the first flow path member and the second flow path member are illustrated. However, in FIGS. 8A and 8B, illustration of the first flow path member is omitted for simplicity.

Five valve gates 285 for injecting the secondary molding resin are provided along the longitudinal direction of the second flow path member 60. In the second flow path member 60, sealing grooves 63 communicating from the valve gates 285 are formed. The sealing grooves 63 constitute, in conjunction with the first flow path member 50, sealing passages in which the secondary molding resin is filled. Note that, in this embodiment, all the valve gates 285 are provided at one end portion in the latitudinal direction of the second flow path member 60. A last filling section 66 to which the secondary molding resin flows out from the sealing passages is provided at the other end portion in the latitudinal direction of the second flow path member 60. Consequently, since the secondary molding resin flows in one direction from the valve gates 285 to the last filling section 66, it is possible to effectively allow gas in the secondary molding resin to escape. It is possible to obtain high joining reliability by suppressing occurrence of a filling failure. Further, since the last filling section 66 is intensively provided at the other end portion, simply by confirming the end portion, it is possible to easily inspect presence or absence of final filling of the secondary molding resin. A direction in which the secondary molding resin flows (a direction in which the sealing grooves 63 extend) is inclined with respect to the latitudinal direction of the second flow path member 60. Therefore, compared with when the direction is parallel to the latitudinal direction, joining strength is improved because a projection area of the joining portion increases. It is possible to obtain higher joining reliability. In contrast, a direction in which the last filling section 66 extends is substantially parallel to the latitudinal direction of the second flow path member 60. However, the vicinity of the last filling section 66 is unrelated to the joining of the flow path members 50 and 60. Accordingly, after sealing of the circumferences of the individual flow paths 213 and 214 is completed, the secondary molding resin reaches the last filling section 66 at a shortest distance. It is possible to obtain effects such as a reduction of a resin capacity and a reduction of a molding cycle.

A wall section constituting the fine common flow path grooves 62 of the second flow path member 60 is thin. Therefore, it is likely that the wall section is deformed and broken by heat and pressure of the secondary molding resin 291 and the secondary molding resin 291 flows into the common flow path grooves 62. However, during the secondary molding step, as illustrated in FIG. 9B, the second flow path member 60 is joined to the first flow path member 50 in a state in which the second flow path member 60 is retained by the die 288 of the fixed mold 282. Consequently, the thin wall section of the second flow path member 60 can be firmly pressed (backed up) by the die 288 of the fixed mold 282. Even if the heat and the pressure by the secondary molding resin 291 are applied to the wall section, it is possible to suppress a leak of the resin.

Note that, as long as the secondary molding resin uniformly flows over the entire contacting portion of the flow path members 50 and 60, the number of valve gates 285 and the disposition of the sealing grooves 63 are not limited to the illustrated examples and can be set as appropriate according to the shape of the individual flow paths 213 and 214, performance of a molding machine in use, and the like.

Figure 10:
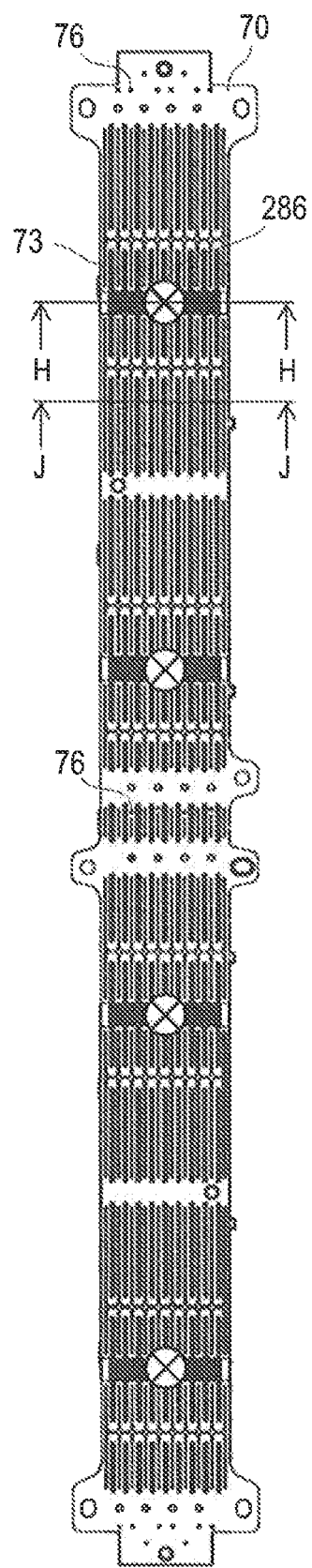
FIG. 10 is a plan view for explaining a tertiary molding step according to the embodiment.
Figure 11A:
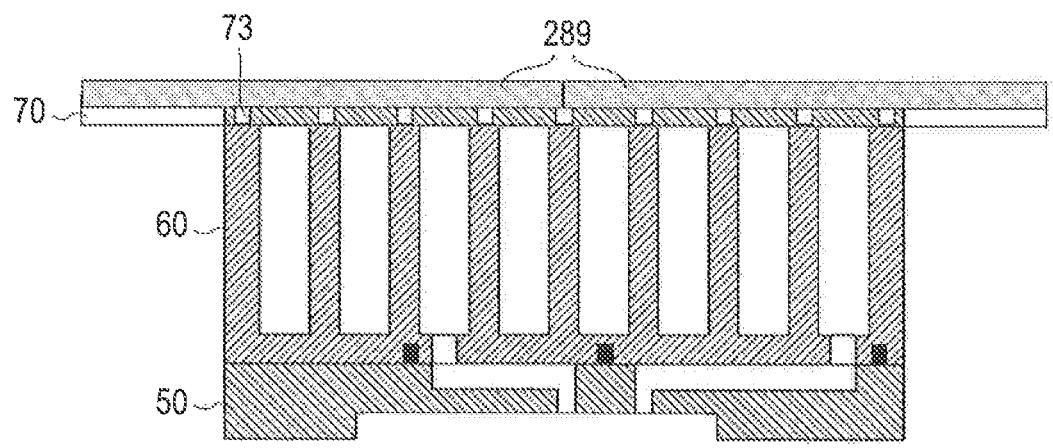
FIGS. 11A, 11B, and 11C are sectional views for explaining the tertiary molding step according to the embodiment.
Figure 11B:
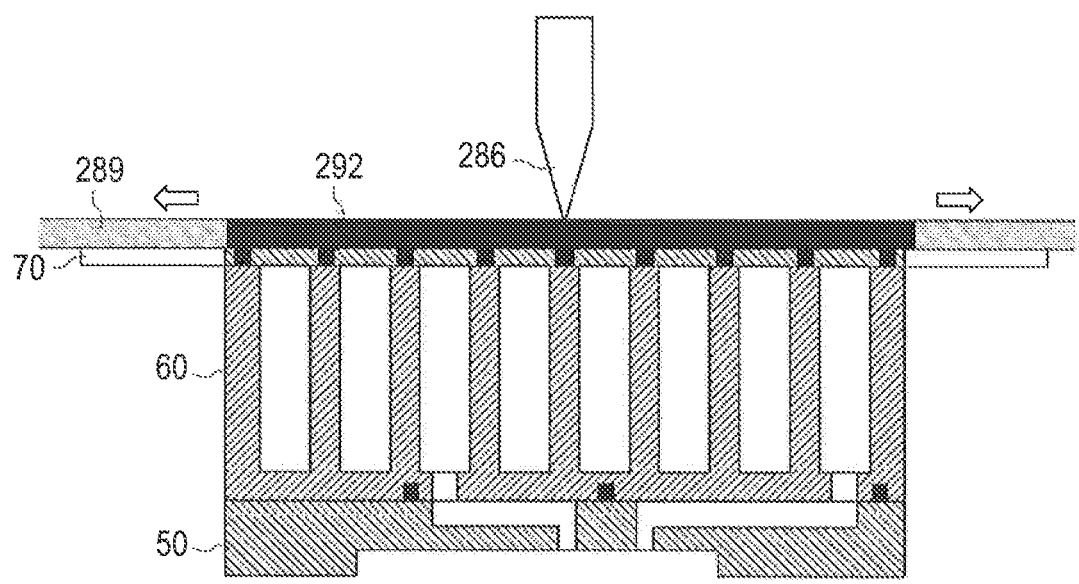
Figure 11C:
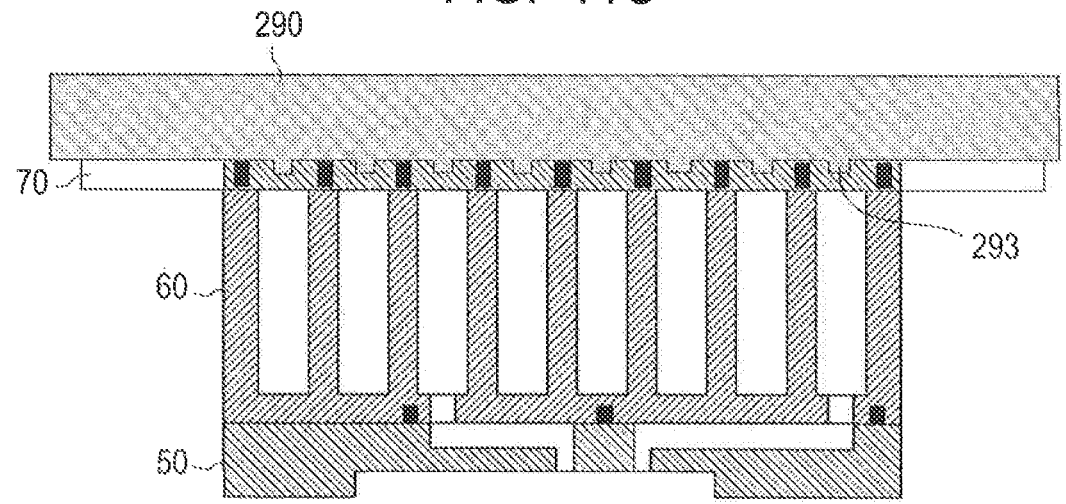
Figure 12A:
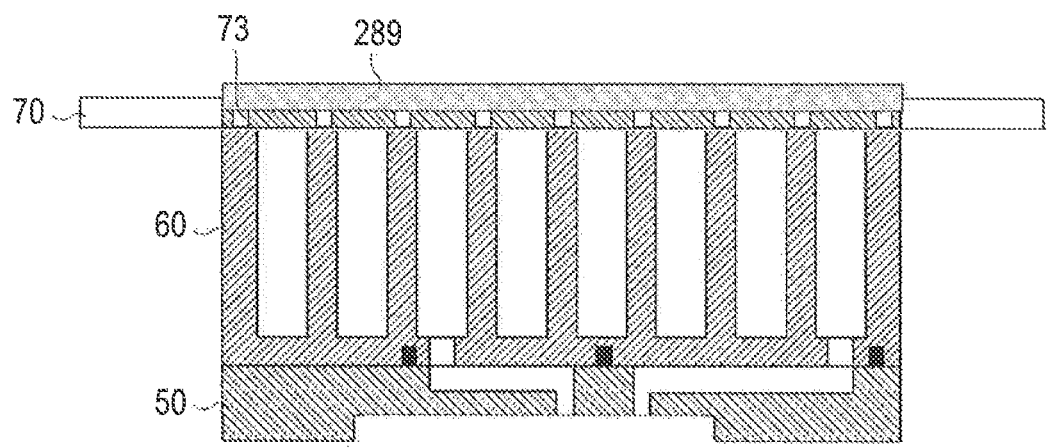
FIGS. 12A and 12B are sectional views for explaining modifications of the tertiary molding step according to the embodiment.
Figure 12B:
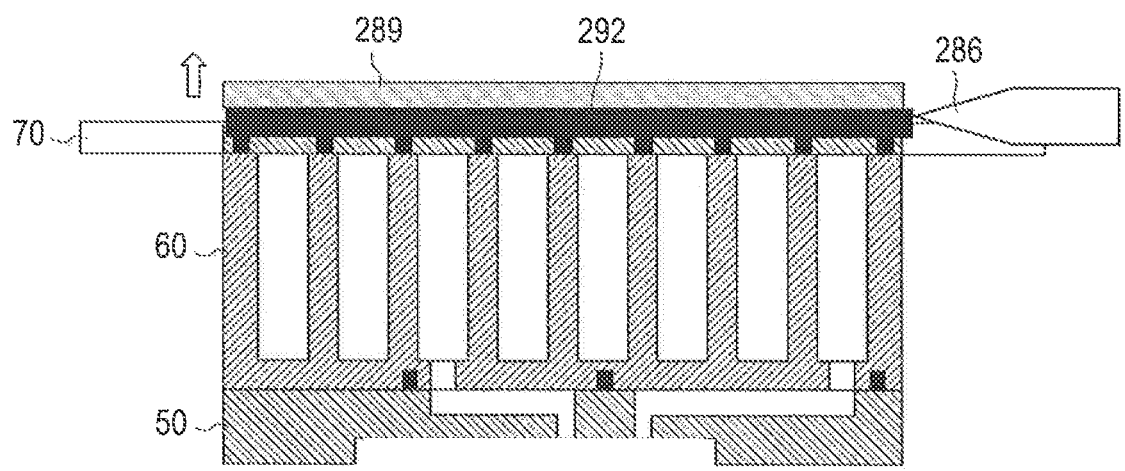

Subsequently, details of the tertiary molding step in the manufacturing method of the flow path constituting member in this embodiment are explained with reference to FIGS. 10 to 12B. FIG. 10 is a plan view of the third flow path member and is a view illustrating an inflow route of tertiary molding resin. FIGS. 11A and 11B are sectional views taken along an H-H line in FIG. 10. FIG. 11C is a sectional view taken along a J-J line in FIG. 10. FIGS. 12A and 12B are sectional views illustrating modifications of the tertiary molding step in this embodiment and are respectively views corresponding to FIGS. 11A and 11B. Note that, in FIG. 10, illustration of the second flow path member is omitted for simplicity.

Four valve gates 286 for injecting the tertiary molding resin are provided along the longitudinal direction of the third flow path member 70. As explained above, the slide die 289, which is a part of a die member of the fixed mold 282, is provided near the valve gates 286. The slide die 289 is capable of sliding between a closed position illustrated in FIG. 11A and an open position illustrated in FIG. 11B. During the tertiary molding step, the slide die 289 slides from the closed position to the open position, whereby a space communicating with the valve gate 286 is formed. On the other hand, in the third flow path member 70, sealing grooves 73 communicating with the space formed in this way are formed. The sealing grooves 73 constitute, in conjunction with the second flow path member 60, sealing passages in which the tertiary molding resin is filled. With such a configuration, the valve gate 286 can be disposed substantially in the center in the latitudinal direction of the third flow path member 70. It is possible to fill the tertiary molding resin in a well-balanced manner. The space formed by the slide die 289 of the fixed mold 282 extends in the latitudinal direction of the third flow path member 70. The sealing passages (the sealing grooves 73) for filling the tertiary molding resin extend in the longitudinal direction of the third flow path member 70. Therefore, the tertiary molding resin ejected from the valve gate 286 flows in the latitudinal direction of the third flow path member 70 first and is thereafter filled in the longitudinal direction. As a result, it is possible to substantially simultaneously fill, in a well-balanced manner, a plurality of sealing passages extending in the longitudinal direction.

The sealing passages in which the tertiary molding resin is filled are terminated as gas escape holes 76, for example, at the end portion and the center in the longitudinal direction of the third flow path member 70. However, a gas vent communicating with the gas escape holes 76 is formed in the die member of the fixed mold 282 that retains the third flow path member 70. Consequently, it is possible to cause the sealing passages to communicate with the outside. It is possible to fill the tertiary molding resin in the sealing passages without causing gas to remain in the tertiary molding resin.

Note that, in the sealing passages in which the tertiary molding resin is filled, a risk of the tertiary molding resin leaking from the sealing passages is high in a part where the pressure of the tertiary molding resin is high, specifically, near the valve gate 286, in particular, in a part adjacent to the space formed by the slide die 289. In such a part, as illustrated in FIG. 11C, the sealing passages face a die 290 of the fixed mold 282 that retains the third flow path member 70. In addition, in portions among the sealing passages (the sealing grooves 73) in the die 290 of the fixed mold 282, projections 293 extending in parallel to the sealing passages are formed to project toward the third flow path member 70. Consequently, it is possible to suppress deformation of the third flow path member 70 by the pressure of the tertiary molding resin, a leak of the tertiary molding resin by the deformation, and the like. Note that, instead of the projections 293 being formed in the die 290 and recesses being formed in the third flow path member 70, the formation of the projections 293 and the formation of the recesses may be opposite. However, from the viewpoint of suppressing deformation of the third flow path member 70, it is preferable that the projections 293 are formed in the die 290 as in this embodiment. In order to improve the strength of the third flow path member 70 in a part where the pressure of the tertiary molding resin is high and suppress deformation, a portion adjacent to the valve gate 286 in the third flow path member 70 may be formed thicker than the other portions.

A method of forming the space into which the tertiary molding resin is injected is not limited to the method explained above. For example, as illustrated in FIGS. 12A and 12B, the slide die 289 may be slid in an opening and closing direction of the metal mold 280 to form the space. Note that, whereas a setting position of the valve gate 286 is the center in the latitudinal direction of the third flow path member 70 in a configuration illustrated in FIGS. 11A and 11B, the setting position is the end portion in the latitudinal direction in a configuration illustrated in FIGS. 12A and 12B. Accordingly, it is preferable to adopt the configuration illustrated in FIGS. 11A and 11B when a filling balance of the tertiary molding resin is considered. However, in both the configurations, the tertiary molding resin is fed into the space formed by the slide die 289 of the fixed mold 282. The slide die 289 of the fixed mold 282 at this time has relatively high temperature because of thermal influence of a hot runner. Accordingly, the tertiary molding resin 292 ejected from the valve gate 286 is filled without being suddenly cooled. The resin easily spreads to the entire sealing passages. As a result, a filling property of the resin is satisfactory.

Note that, in the illustration in the embodiment explained above, the flow path constituting member is constituted from the three members (the first to third flow path members). However, the present disclosure is not limited to this and is also applicable when the flow path constituting member is constituted from four or more members. The present disclosure is not limited to only the flow path constituting member of the liquid ejection head and is widely applicable to a long member mounted on an inkjet recording apparatus (a liquid ejection apparatus).

According to the present disclosure, it is possible to manufacture a flow path constituting member, which is a resin molded article, with high reliability without causing an increase in the size and complication of a metal mold.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-219561, filed Dec. 4, 2019, which is hereby incorporated by reference herein in its entirety.

What is claimed is:
1. A manufacturing method of a liquid ejection head including manufacturing a flow path constituting member for supplying a liquid to a plurality of an ejection module, the manufacturing of the flow path constituting member including using a metal mold which is constituted of a fixed mold and a movable mold, and the ejection module being configured to eject the liquid, the manufacturing of the flow path constituting member comprising:

a first step of molding a first member, a second member, and a third member independently at locations different from each other in the metal mold by clamping the metal mold and injecting a resin to an inside of the metal mold, the first member, the second member, and the third member constituting the flow path constituting member;

a second step of joining the first member and the second member by injecting a first sealing resin to a first contacting portion, the first contacting portion being formed by contacting the first member and the second member with each other by clamping the metal mold after opening the metal mold and sliding the movable mold to a position at which the first member retained at the movable mold and the second member retained at the fixed mold are opposite to each other; and a third step of joining the second member and the third member by injecting a second sealing resin to a second contacting portion, the second contacting portion being formed by contacting the second member and the third member with each other by clamping the metal mold after opening the metal mold and sliding the movable mold to a position at which the second member retained at the movable mold and the third member retained at the fixed mold are opposite to each other, wherein the first, second, and third steps are performed in this order, wherein the first sealing resin and the second sealing resin are respectively injected from different positions of the fixed mold, wherein in the third step, the second sealing resin is injected from a gate provided in the fixed mold in a position opposed to a center in a latitudinal direction of the third member, wherein in the first step, the first to third members are respectively formed in a rectangular plate shape, wherein the third step includes, after bringing the second member and the third member into contact with each other, sliding at least a part of a die member of the fixed mold that retains the third member, forming a space communicating with the gate between the die member and the third member, and injecting the second sealing resin from the space that was formed, wherein in the third step, a passage communicating with the space is formed in the second contacting portion, and the second member and the third member are joined by filling the second sealing resin in the passage, and wherein a gas vent for causing the passage to communicate with an outside is formed in the die member.

2. The manufacturing method of the liquid ejection head according to claim 1, wherein the space is formed along the latitudinal direction of the third member, and the passage is formed along a longitudinal direction of the second and third members.

3. The manufacturing method of the liquid ejection head according to claim 1, wherein the gas vent is formed in the die member in a position opposed to at least one of an end portion and a center in a longitudinal direction of the third member.

4. The manufacturing method of the liquid ejection head according to claim 1, wherein at least a portion of the passage adjacent to the space faces the die member.

5. A manufacturing method of a liquid ejection head including manufacturing a flow path constituting member for supplying a liquid to a plurality of an ejection module, the manufacturing of the flow path constituting member including using a metal mold which is constituted of a fixed mold and a movable mold, and the ejection module being configured to eject the liquid, the manufacturing of the flow path constituting member comprising:

a first step of molding a first member, a second member, and a third member independently at locations different from each other in the metal mold by clamping the metal mold and injecting a resin to an inside of the metal mold, the first member, the second member, and the third member constituting the flow path constituting member;

a second step of joining the first member and the second member by injecting a first sealing resin to a first contacting portion, the first contacting portion being formed by contacting the first member and the second member with each other by clamping the metal mold after opening the metal mold and sliding the movable mold to a position at which the first member retained at the movable mold and the second member retained at the fixed mold are opposite to each other; and a third step of joining the second member and the third member by injecting a second sealing resin to a second contacting portion, the second contacting portion being formed by contacting the second member and the third member with each other by clamping the metal mold after opening the metal mold and sliding the movable mold to a position at which the second member retained at the movable mold and the third member retained at the fixed mold are opposite to each other, wherein the first, second, and third steps are performed in this order, wherein the first sealing resin and the second sealing resin are respectively injected from different positions of the fixed mold, wherein in the third step, the second sealing resin is injected from a gate provided in the fixed mold in a position opposed to a center in a latitudinal direction of the third member, wherein in the first step, the first to third members are respectively formed in a rectangular plate shape, wherein the third step includes, after bringing the second member and the third member into contact with each other, sliding at least a part of a die member of the fixed mold that retains the third member, forming a space communicating with the gate between the die member and the third member, and injecting the second sealing resin from the space that was formed, wherein in the third step, a passage communicating with the space is formed in the second contacting portion, and the second member and the third member are joined by filling the second sealing resin in the passage, and wherein a projection projecting toward the third member and extending in parallel to the passage is formed in the die member.

6. The manufacturing method of the liquid ejection head according to claim 1, wherein, in the first step, the third member is formed such that a portion adjacent to the gate is thicker than other portions.

7. The manufacturing method of the liquid ejection head according to claim 1, wherein in the second step, the first sealing resin is injected from a second gate, and the second gate is provided in the fixed mold in a position opposed to the second member.

8. The manufacturing method of the liquid ejection head according to claim 7, wherein the second gate into which the first sealing resin is injected is provided in the fixed mold in a position opposed to an end portion in a latitudinal direction of the second member.

9. The manufacturing method of the liquid ejection head according to claim 8, wherein in the second step, a second passage communicating with the second gate is formed in the first contacting portion, and the first member and the second member are joined when the first sealing resin is filled in the second passage.

10. The manufacturing method of the liquid ejection head according to claim 9, wherein the second passage is formed along a latitudinal direction of the first and second members.

11. The manufacturing method of the liquid ejection head according to claim 1, further comprising, after the manufacturing of the flow path constituting member, joining the ejection module to the first member of the flow path constituting member, wherein in the manufacturing of the flow path constituting member, the first member is retained by a die member of the movable mold in a state in which the first member is in contact with the movable mold.

12. The manufacturing method of the liquid ejection head according to claim 5, wherein the space is formed along the latitudinal direction of the third member, and the passage is formed along a longitudinal direction of the second and third members.

13. The manufacturing method of the liquid ejection head according to claim 5, wherein at least a portion of the passage adjacent to the space faces the die member.

14. The manufacturing method of the liquid ejection head according to claim 5, wherein, in the first step, the third member is formed such that a portion adjacent to the gate is thicker than other portions.

15. The manufacturing method of the liquid ejection head according to claim 5, wherein in the second step, the first sealing resin is injected from a second gate, and the second gate is provided in the fixed mold in a position opposed to the second member.

16. The manufacturing method of the liquid ejection head according to claim 15, wherein the second gate into which the first sealing resin is injected is provided in the fixed mold in a position opposed to an end portion in a latitudinal direction of the second member.

17. The manufacturing method of the liquid ejection head according to claim 16, wherein in the second step, a second passage communicating with the second gate is formed in the first contacting portion, and the first member and the second member are joined when the first sealing resin is filled in the second passage.

18. The manufacturing method of the liquid ejection head according to claim 17, wherein the second passage is formed along a latitudinal direction of the first and second members.

19. The manufacturing method of the liquid ejection head according to claim 5, further comprising, after the manufacturing of the flow path constituting member, joining the ejection module to the first member of the flow path constituting member, wherein in the manufacturing of the flow path constituting member, the first member is retained by a die member of the movable mold in a state in which the first member is in contact with the movable mold.

* * * * *